United States Patent
Fukuda et al.

(10) Patent No.: US 7,373,129 B2
(45) Date of Patent: May 13, 2008

(54) RADIO COMMUNICATION TERMINAL

(75) Inventors: Atsushi Fukuda, Yokohama (JP);
Yoshiaki Tarusawa, Yokosuka (JP);
Noriyoshi Terada, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 360 days.

(21) Appl. No.: 10/765,830

(22) Filed: Jan. 29, 2004

(65) Prior Publication Data

US 2004/0185815 A1 Sep. 23, 2004

(30) Foreign Application Priority Data

Jan. 31, 2003 (JP) .............................. 2003-024572

(51) Int. Cl.
*H04B 1/10* (2006.01)

(52) U.S. Cl. ................ 455/296; 455/307; 455/67.11

(58) Field of Classification Search ................ 455/296, 455/297, 138, 67.11, 67.12, 67.13, 67.14, 455/63.1, 63.3, 67.16, 307, 303, 306, 308
See application file for complete search history.

(56) References Cited

U.S. PATENT DOCUMENTS

| | | | |
|---|---|---|---|
| 4,177,430 A | 12/1979 | Paul | |
| 4,320,535 A | 3/1982 | Brady et al. | |
| 4,989,262 A * | 1/1991 | Saito | 455/138 |
| 5,537,443 A | 7/1996 | Yoshino et al. | |
| 6,147,985 A | 11/2000 | Bar-David et al. | |
| 2002/0072344 A1 | 6/2002 | Souissi | |
| 2004/0125235 A1 * | 7/2004 | Kim et al. | 455/67.11 |
| 2007/0058081 A1 * | 3/2007 | Kim et al. | 455/296 |

FOREIGN PATENT DOCUMENTS

| | | | |
|---|---|---|---|
| EP | 0 637 139 | | 2/1995 |
| EP | 1 195 912 | | 4/2002 |
| JP | 04-047705 | | 2/1992 |
| JP | 04047705 | * | 2/1992 |
| JP | 05-160762 | | 6/1993 |
| JP | 05160762 | * | 6/1993 |
| JP | 7-38479 | | 2/1995 |
| JP | 8-255117 | | 10/1996 |
| JP | 11-27160 | | 1/1999 |
| JP | 2000-188568 | | 7/2000 |

* cited by examiner

*Primary Examiner*—Lana Le
(74) *Attorney, Agent, or Firm*—Oblon, Spivak, McClelland, Maier & Neustadt, P.C.

(57) ABSTRACT

A radio communication terminal disposed in close proximity to or built in electronic equipment is provided with a receiver connected to a receiving antenna and an interference canceller for removing from a received signal a radiated noise component from the electronic equipment received by the receiving antenna. The interference canceller includes a radiated noise predictor which predicts the radiated noise component in the received signal based on the radiated noise from the electronic equipment and generates a pseudo interference signal accordingly, and an adder which cancels the radiated noise component in the received signal by the pseudo interference signal.

6 Claims, 9 Drawing Sheets

RADIO COMMUNICATION TERMINAL

BACKGROUND OF THE INVENTION

The present invention relates to a radio communication terminal that cancels radiated noise to improve the transmission performance of radio communication system.

An increase in the clock frequency of a personal computer raises a problem that a clock signal by the personal computer affects a radio communication terminal disposed adjacent hereto for use in combination therewith. This is shown in FIG. 12. In FIG. 12 a base station 10 and a radio communication terminal 20 exchange information over a radio channel 13. In this instance, the radio communication terminal 20 receives, as well, radiated noise $N_R$ from a personal computers or similar electronic equipment 30 disposed in close proximity thereto. The radio communication terminal 20 is not only a portable terminal but also a terminal built in electronic equipment (a personal computer), such as a PC card type radio communication terminal incorporated in the personal computer.

In general, a receiver in the radio communication terminal receives an information signal $S_D$ shown in FIG. 13, then limits its band with such a filter characteristic as shown in FIG. 14. However, the radiated noise $N_R$ superimposed in the same band as that of the information signal $S_D$ cannot be cancelled by the filter characteristic 12. Accordingly, the radiated noise $N_R$ degrades the transmission quality of the information signal $S_D$.

One possible method to lessen the influence of radiated noise is to locate the receiving antenna away from the radiated noise source, but in particular, when it is built in electronic equipment, no sufficient measures can be taken because of miniaturization of device and ease in attachment of the antenna itself, for instance.

There are still some more interference signals that enter the receiving band. A typical example is an echo. This is a phenomenon that, for example, in a telephone line a transmitted signal leaks from the transmit path back into the receive path by an electrical mismatch between analog telephony devices and transmission media in a portion of the network. The echo degrades the speech quality. To cope with this problem, an echo canceller is available. That is, the echo canceller cancels the unwanted echo by subtracting the expected echo (pseudo echo) estimated from the transmitted signal on the received path.

In contrast thereto, as for the interference caused by the radiated noise, there are still unavailable techniques for generating pseudo radiated noise that corresponds to pseudo echo and, therefore, it is impossible to cancel the radiated noise by use of the echo canceller technology.

SUMMARY OF THE INVENTION

It is therefore an object of the present invention to provide a radio communication terminal equipped with a function of canceling radiated noise that gets mixed in the received signal.

The radio communication terminal according to the present invention comprises:
a receiver connected to a receiving antenna; and
interference canceller for canceling a radiated noise component of electronic equipment from the received signal;
wherein said interference canceller includes:
a radiated noise predictor for generating a pseudo interference signal base on the radiated noise produced by said electronic equipment; and an adder for adding together said received signal and said pseudo interference signal to cancel said radiated noise component in said received signal.

According to the present invention, the pseudo interference signal is generated directly using the radiated noise from the electronic equipment, or using the radiated noise component contained in the received signal, and the pseudo interference signal is subtracted from the received signal received by the receiver. Hence, the radio communication terminal according to the present invention obtains a received signal free from radiated noise.

DETAILED DESCRIPTION OF THE PREFERRED EMBODIMENTS

Figure 1:
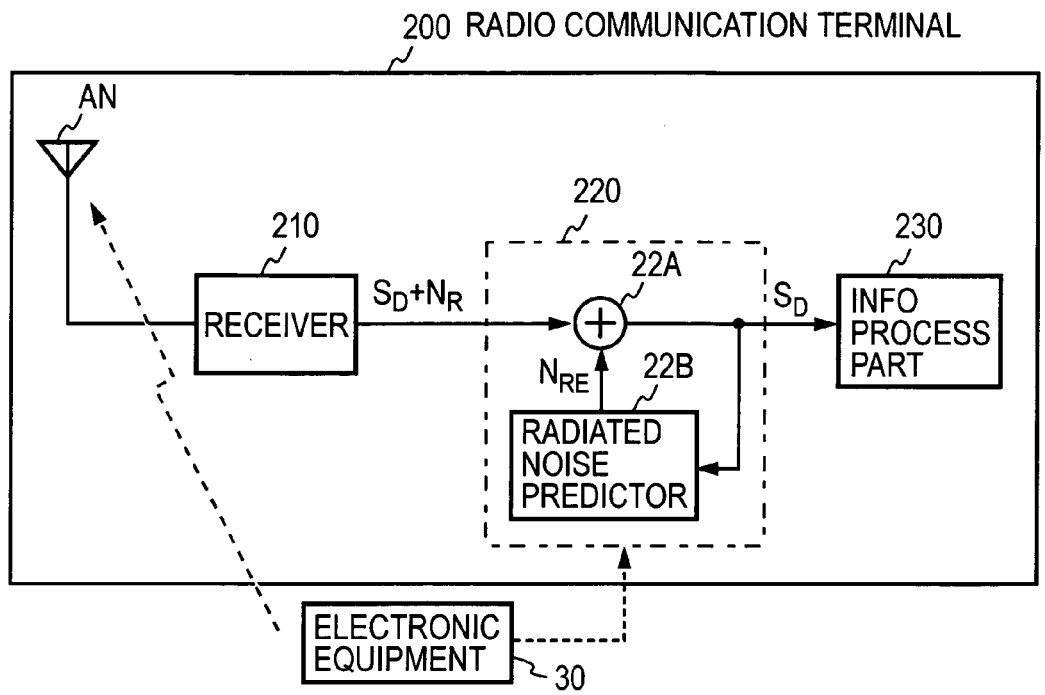
FIG. 1 is a block diagram for explaining a general outline of the radio communication terminal according to the present invention.

FIG. 1 illustrates in block form an embodiment of the radio communication terminal according to the present invention. A radio communication terminal 200 is made up of: a receiver 210 which converts the received signal to intermediate frequency (IM) band signal or base band signal and demodulates it; an interference canceller 220 which cancels radiated noise from electronic equipment; and an information processing part 230. The interference canceller 220 has an adder 22A and a radiated noise predictor 22B. The information processing part 230 performs primary data processing of the radio communication terminal, which, for example, when the radio communication terminal 200 is a portable telephone, includes not only speech signal processing and originating and terminating processing but also digital processing for performing various additional functions of the portable telephone.

The received signal received by an antenna AN and output from the receiver 210 contains an information signal component $S_D$ and a radiated noise component $N_R$ from the electronic equipment 30. In the interference canceller 220 the radiated noise predictor 22B generates a pseudo interference signal $N_{RE}$ based on radiated noise fed thereto directly from the electronic equipment or the radiated noise component extracted from the received signal, and the adder 22A cancels the radiated noise component $N_R$ contained in the received signal by the pseudo interference signal $N_{RE}$ and inputs the remaining information signal component $S_D$ to the information processing part 230. As a result, the information transmission quality of the information signal component SD that is input to the information processing part 230 is improved and the error rate of data can be reduced.

Figure 2:
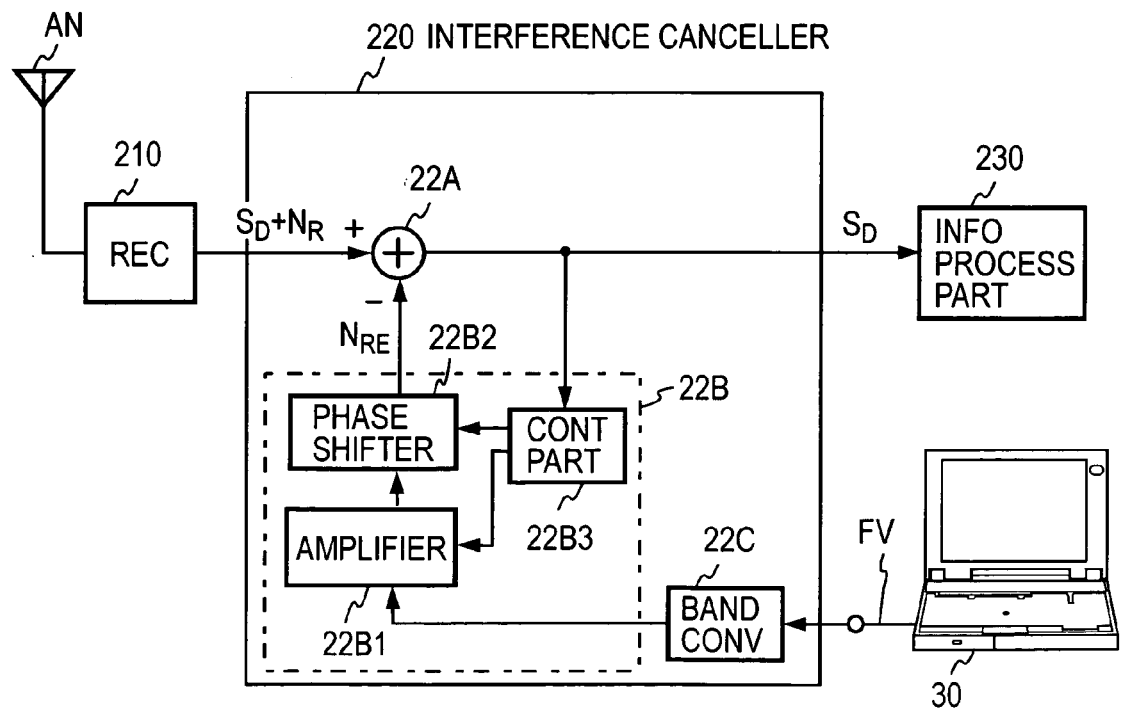
FIG. 2 is a block diagram for explaining a first embodiment of the radio communication terminal according to the present invention.

FIG. 2 illustrates in block form a first embodiment of the communication terminal according to the present invention. The interference canceller 220 in this embodiment is composed of the adder 22A, radiated noise predictor 22B and a band converting part 22C. The radiated noise predictor 22B in this embodiment is shown to comprise an amplifier 22B1, a phase shifter 22B2 and a control part 22B3.

The radiated noise $N_R$ is input directly to the band converting part 22C via a cable FV connected to an internal electronic circuit of the electronic equipment 30 that is an interference source. The radiated noise $N_R$ contains, for example, a clock signal for driving the electronic equipment 30, switching noise of a gate circuit and so on, but the noise component the noise level temporally changes slowly and can be regarded to stay at substantially the same level. The band converting part 22C down-converts the radiated noise $N_R$ fed thereto directly from the electronic equipment 30 to the same band as the output frequency band of the receiver 210 and thus limits the band of the radiated noise $N_R$. The output from the band converting part 22C is given a desired gain (attenuated or amplified) by the amplifier 22B1 and is controlled in phase by the shifter 22B2. The output from the phase shifter 22B2 is provided as the pseudo signal $N_{RE}$ to the adder 22A, wherein it is added with the output from the receiver 210.

The control part 22B3 controls the gain of the amplifier 22B1 and the shift amount of the phase shifter 22B2 so that the pseudo interference signal $N_{RE}$ becomes opposite in phase to and equal in level to the interference signal (radiated noise) that is contained in the received signal. This is accomplished, for example, by adjusting the output noise power from the adder 22A to be minimum. By adding the pseudo interference signal $N_{RE}$, which is opposite in phase to the interference signal, to the received signal by the adder 22A, the information signal $S_D$ is obtained from which has been removed the interference signal component in the received signal, that is, the received radiated noise component $N_R$. The pseudo interference signal $N_{RE}$ may also be adjusted to be in-phase with the interference signal, in which case it is subtracted by the adder 2A from the received signal. Further, the control part 22B3 may also control the amplifier 22B1 and the phase shifter 22B2 so that the SN ratio of the output from the adder 22A become maximum.

Figure 3:
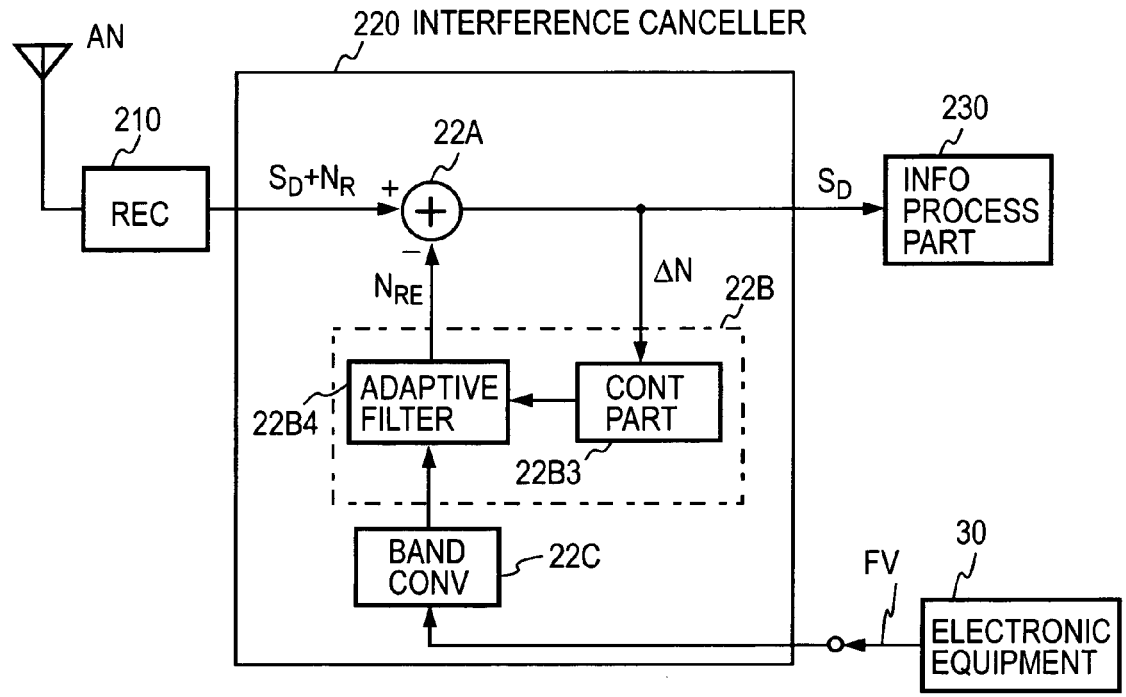
FIG. 3 is a block diagram for explaining a second embodiment of the radio communication terminal according to the present invention.

FIG. 3 illustrates in block form a second embodiment of the radio communication terminal according to the present invention, in which the radiated noise predictor 22B in the FIG. 2 embodiment is formed by a control part 22B3 and an adaptive filter 22B4. The adaptive filter 22B4 is supplied via the band converting part 22C with the radiated noise component directly derived from the electronic equipment 30, and the filter 22B4 performs filtering of the radiated noise component to generate the pseudo interference signal $N_{RE}$. In a no-signal period (a transmission interruption period of the base station) a difference signal $\Delta N$, obtained by subtracting the pseudo signal $N_{RE}$ by the adder 22A from the received signal, is input as an error signal to the control part 22B3. The control part 22B3 determines filter coefficients that will minimize the power of the error signal $\Delta N$ (a mean square value of amplitude), and sets them in the adaptive filter 22B4. As a result, the adaptive filter 22B4 operates to remove the interference signal component $N_R$ from the received signal. The control part 22B3 may also determine the coefficients of the adaptive filter 22B4 that will maximize the SN ratio of the output signal from the adder 22A.

Figure 4:
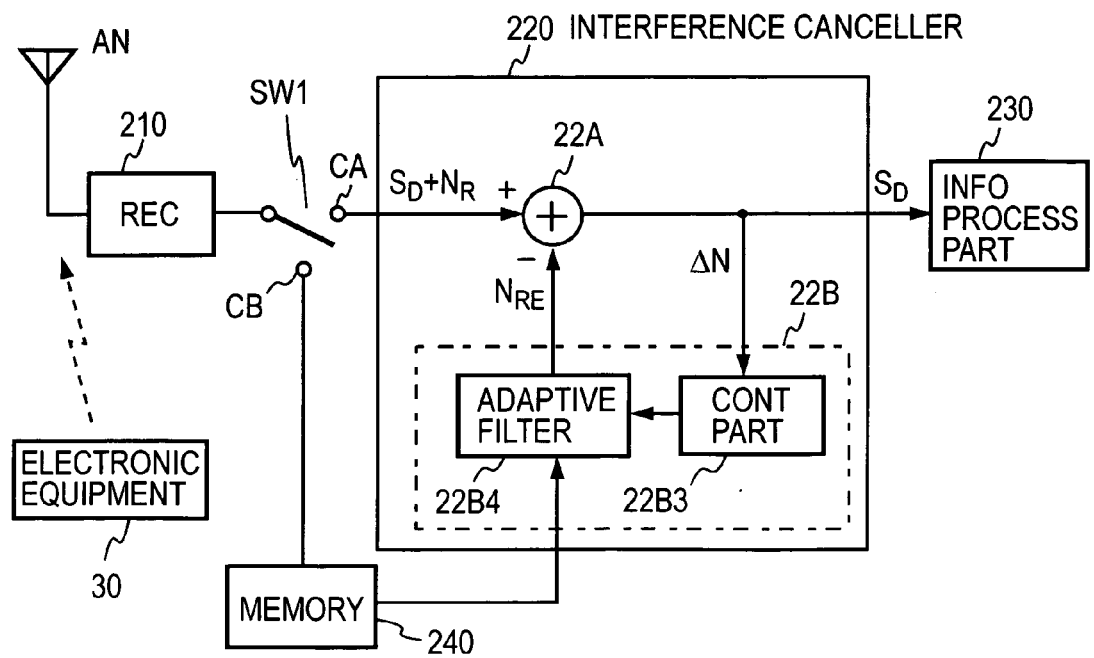
FIG. 4 is a block diagram for explaining a third embodiment of the radio communication terminal according to the present invention.

FIG. 4 illustrates in block form a third embodiment of the radio communication terminal according to the present invention, in which the receiver 210 outputs a digitized received signal and the interference canceller 220 also performs interference cancellation through digital processing. In this embodiment, the radiated noise predictor 22B comprises the control part 22B3 and the adaptive filter 22B4. Further, instead of obtaining the radiated noise directly from the received signal as in the embodiments FIGS. 2 and 3, this embodiment derives the radiated noise component in advance from the received signal as described below and generates the pseudo interference signal $N_{RE}$ accordingly. The filter coefficients of the adaptive filter 22B4 are updated, for example, for each fixed period. When the radiated noise component does not much vary with time, the filter coefficients of the adaptive filter 22B4 may be fixed.

Figure 12:
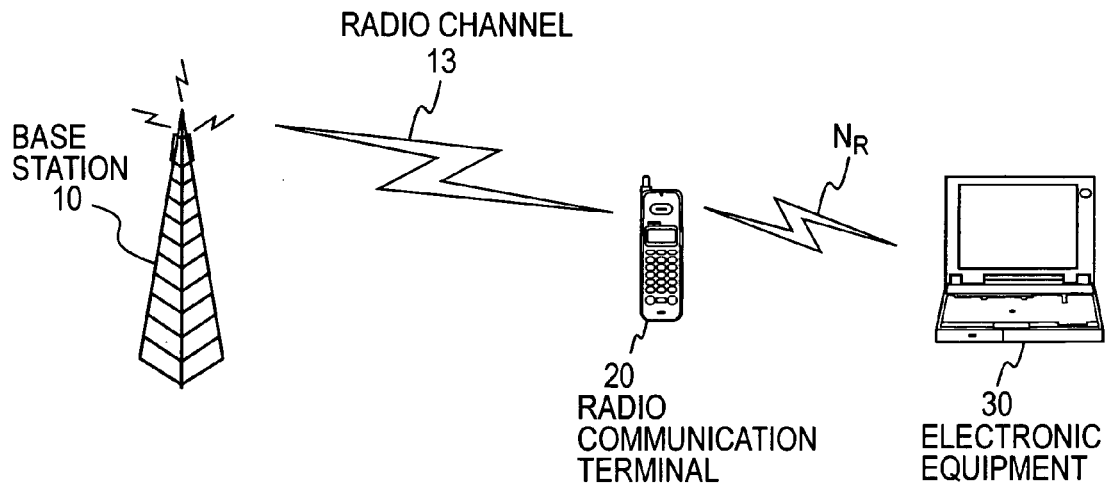
FIG. 12 is a block diagram for explaining the prior art.
Figure 13:
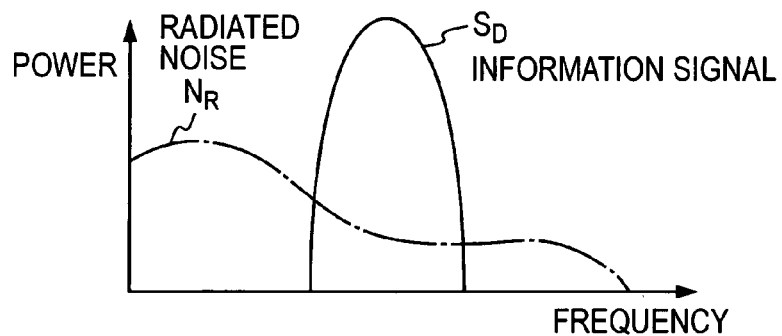
FIG. 13 is a graph for explaining the operation of the prior art.
Figure 14:
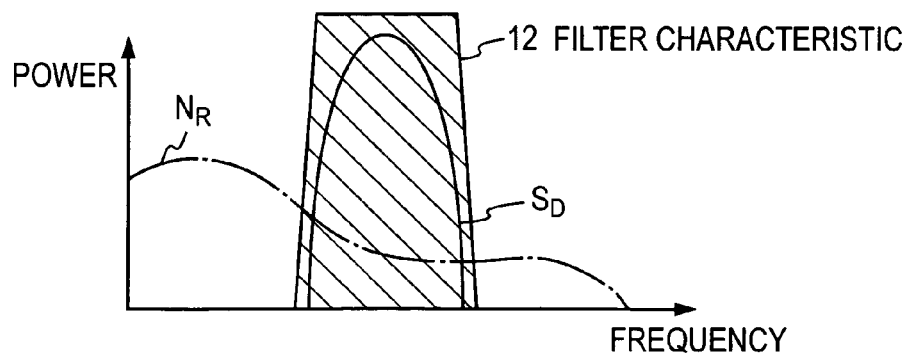
FIG. 14 is a graph for explaining an defect of the prior art.

In this embodiment, when no particular communication channel is established, for example, when the radio communication terminal of the present invention is connected to the base station 10 (see FIG. 12), a switch SW1 is connected to a contact CB side during the transmission interruption period of the base station to receive only radiated noise within a fixed period and the radiated noise is stored in a memory 240. Next, the switch SW1 is changed over to a contact CA to input therethrough the received radiated noise during the no-signal period to the interference canceller 220, and at the same time, the radiated noise is read out of the memory 240 and provided to the adaptive filter 22B4 to generate the pseudo interference signal $N_{RE}$, and the filter coefficients of the adaptive filter 22B4 are so determined as to minimize the power of the error signal $\Delta N$ output from the adder 22A as in the case of the FIG. 3 embodiment. Then, during the transmission period of the base station 10 the received signal $(S_D+N_R)$ is input to the interference canceller 220, wherein the radiated noise component is cancelled by the pseudo interference signal $N_{RE}$. The filter coefficients may also be determined such that the SN ratio of the output signal from the adder 22A become maximum during the transmission period of the base station 10. The FIG. 4 embodiment is particularly effective in cancellation of radiated noise of small temporal variations, and the filter coefficients of the adaptive filter 22B4 may be fixed.

Figure 5:
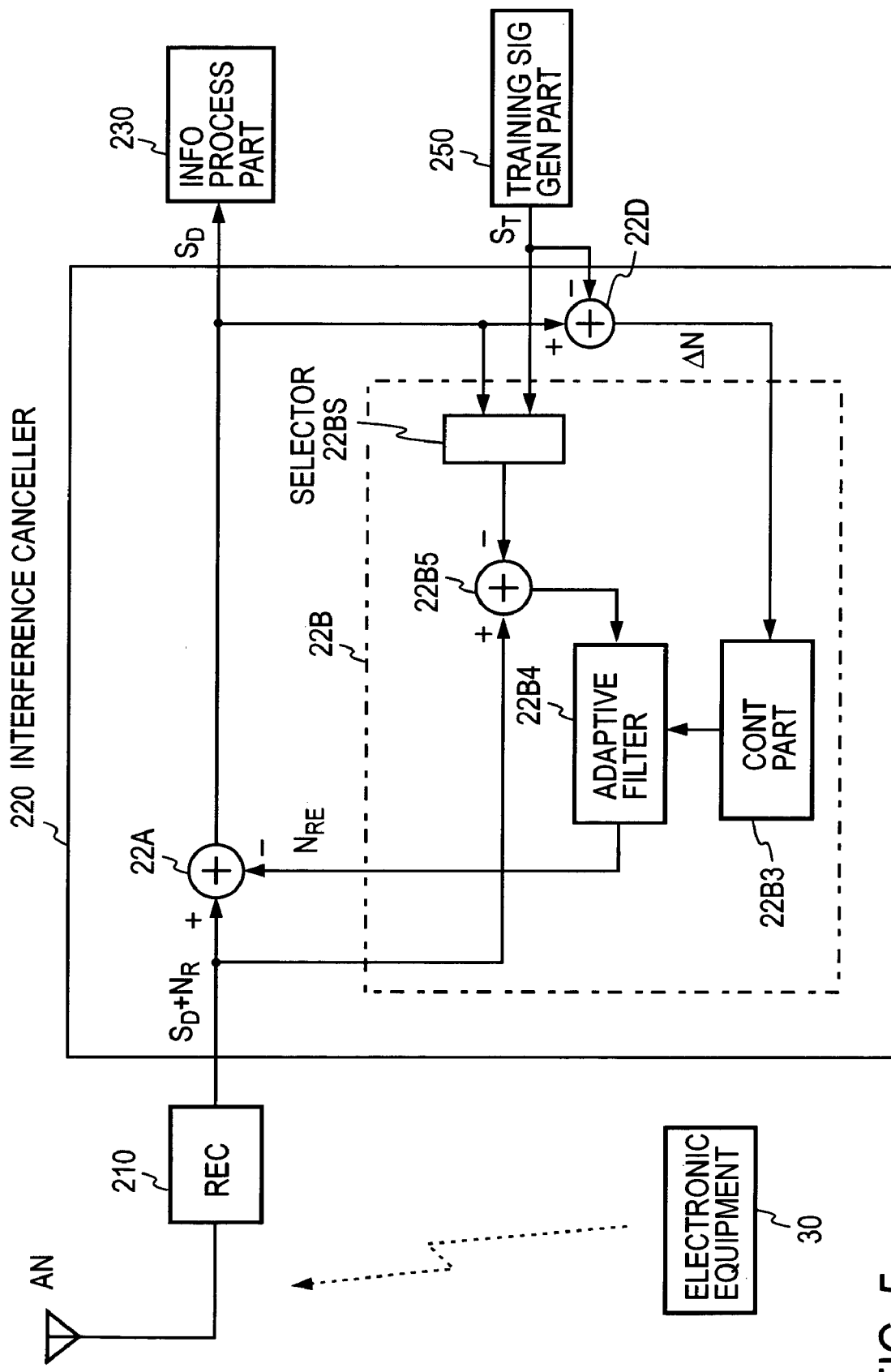
FIG. 5 is a block diagram for explaining a fourth embodiment of the radio communication terminal according to the present invention.

FIG. 5 illustrates in block form a fourth embodiment of the radio communication terminal according to the present invention. The illustrated radio communication terminal is provided with a training signal generating part 250, and the interference canceller 220 is composed of the adder 22A, the radiated noise predictor 22B and a subtractor 22D. The radiated noise predictor 22B is made up of the control part 22B3, the adaptive filter 22B4, a subtractor 22B5 and a selector 22BS.

For example, a transmitter of the base station transmits a known training signal during a predetermined frame period (a training period), and in the a received signal training period the radio communication terminal selects, by the selector 22BS, a training signal $S_T$ generated by the training signal generating part 250 and provides it to the subtractor 22B5. The subtractor 22B5 subtract the training signal $S_T$ as the information signal $S_D$ from the received signal to thereby extract the interference signal (the radiated noise component) attributable to the radiated noise of the electronic equipment 30. The extracted interference signal is input to the adaptive filter 22B4 to generate the pseudo interference signal $N_{RE}$. The pseudo interference signal $N_{RE}$ is subtracted by the subtractor 22A from the received signal, then the resulting error signal $(S_D+N_R-N_{RE})$ is fed to the subtractor 22D, whereby the training signal $S_T$ is subtracted to generate the error signal $\Delta N$ $(=N_R-N_{RE})$, which is provided to the control part 22B3. The control part 22B3 controls the filter coefficients of the adaptive filter 22B4 so that the power of the error signal $\Delta N$ becomes minimum, and sets the filter coefficients in the adaptive filter 22B4. Alternatively, the filter coefficients may be so determined as to maximize the SN ratio of the output signal from the adder 22A.

When the filter coefficients of the adaptive filter 22B4 converge so that the power of the error signal $\Delta N$ becomes minimum during the training signal period, the control part 22B3 does not update the filter coefficients. The selector 22D selects and provides the output error signal $\Delta N$ of the adder 22A to the subtractor 22B5, wherein it is subtracted from the received signal to extract the interference signal component, which is processed by the adaptive filter 22B4 to generate the pseudo interference signal $N_{RE}$.

While in the embodiments of FIGS. 2 and 3 the interference canceller 220 is supplied with the received signal demodulated by the receiver 210 and converted to the base band, the interference canceller 220 may be placed at the input side of the receiver 210 to perform interference cancellation in the high-frequency band. In this case, the band converting part 22C is not used.

Figure 6:
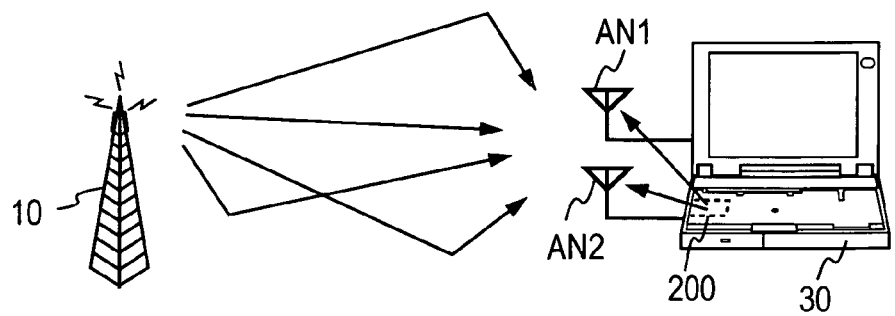
FIG. 6 is a diagram for explaining paths of receiving radio waves.

FIG. 6 shows another example of the radio-wave use environment of the broken-lined radio communication terminal 200 built in (or disposed in close proximity to) the electronic equipment 30. In this example, the radio communication terminal 200 is shown to have two antennas AN1 and AN2. Radio waves transmitted from the base station 10 far away from the radio communication terminal 200 are received by the two antennas AN1 and AN2 of the latter. The two antennas AN1 and AN2 receive radiated noise from the electronic equipment 30 as well.

Figure 7A:
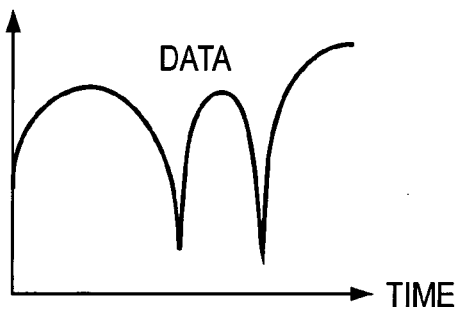
FIG. 7A is a graph showing an example of a received signal received by one of two antennas from a base station.
Figure 7B:
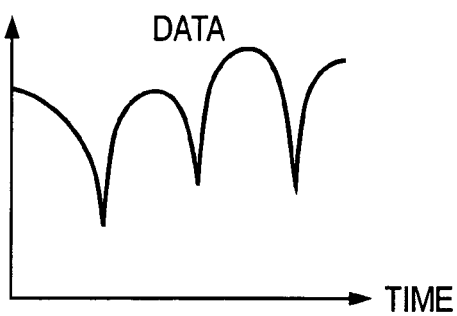
FIG. 7B is a graph showing an example of a received signal received by the other antenna from the base station.

In general, in a mobile communication environment signals transmitted from the remote base station 10 are reflected by a number of buildings in a city to propagate over many paths, and hence they are delayed and attenuated differently from one another. On this account, multi-path composite signals received by the antennas AN1 and AN2 spaced a certain distance apart are low in the correlation between signals (data) as depicted in FIGS. 7A and 7B.

Figure 7C:
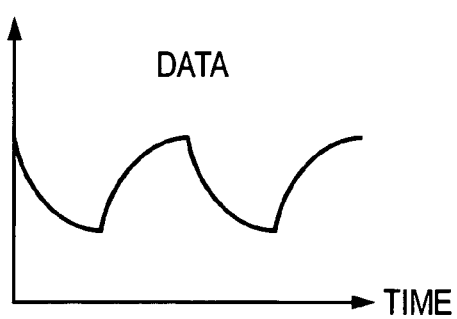
FIG. 7C is a graph showing an example of a received signal received by the one antenna from nearby electronic equipment.
Figure 7D:
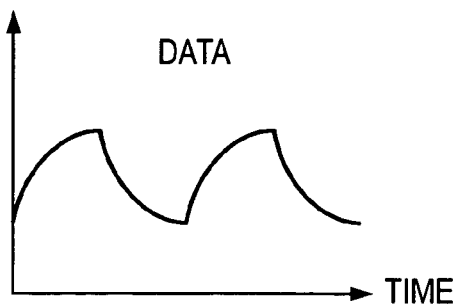
FIG. 7D is a graph showing an example of a received signal received by the other antenna from the nearby electronic equipment.

On the other hand, since radiated noise from the electronic equipment 30 built in the radio communication terminal 200 are received directly by the two antennas without being reflected and scattered, the two signals received by the two antennas slightly differ in phase as shown in FIGS. 7C and D, and hence they are closely correlated with each other.

Figure 8:
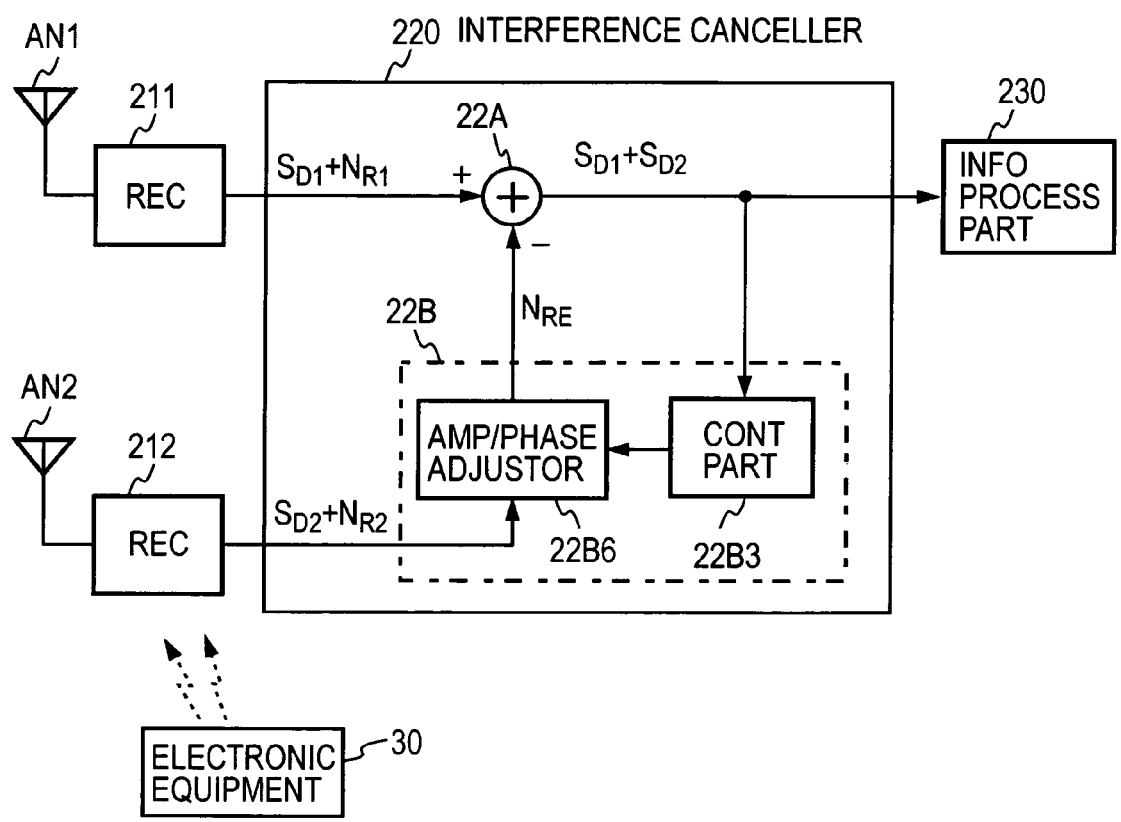
FIG. 8 is a block diagram for explaining a first fifth of the radio communication terminal according to the present invention.

FIG. 8 illustrates in block form another embodiment of the radio communication terminal according to the present invention which has two antennas. Received signals from the receiving antennas AN1 and AN2 are demodulated by receivers 211 and 212, and the demodulated signals are input to the interference canceller 220. The interference canceller 220 has the adder 22A and the radiated noise predictor 22B. Based on the output from the adder 22A, the pseudo interference signal $N_{RE}$ is generated from the radiated noise from the electronic equipment 30 received by the receiver 212, and the pseudo interference signal $N_{RE}$ is fed to the adder 22A to cancel the radiated noise component contained in the each received signal, and the information signal $S_D$ having removed therefrom the radiated noise component is provided to the information processing part 230.

The noise predictor 22B comprises the control part 22B3 and an amplitude/phase adjustor 22B6. The amplitude/phase adjustor 22B6 is equivalent to the pair of amplifier 22B1 and phase shifter 22B2 in the FIG. 2 embodiment. This embodiment is effective when the interference signals (radiated noises) received by the two receiving antennas AN1 and AN2 are closely correlated with each other. That is, based on the output from the adder 22A, the control part 22B3 adjusts the amplitude/phase adjuster 22B6 so that the interference signals received by the antennas AN1 and AN2 cancel each other in the amplitude/phase adjustor 22B6. This adjustment is made in the transmission interruption period of the base station, for instance.

Another adjustment method is to send a known training signal from the base station and adjust the amplitude/phase adjustor 22B6 so that the signal power vs. mean power (interference signal power+noise power) ratio for the received training signal becomes maximum. By this, the radiated noise can be attenuated to substantially zero when the interference signals received by the antennas AN1 and AN2 are closely correlated with other.

Figure 9:
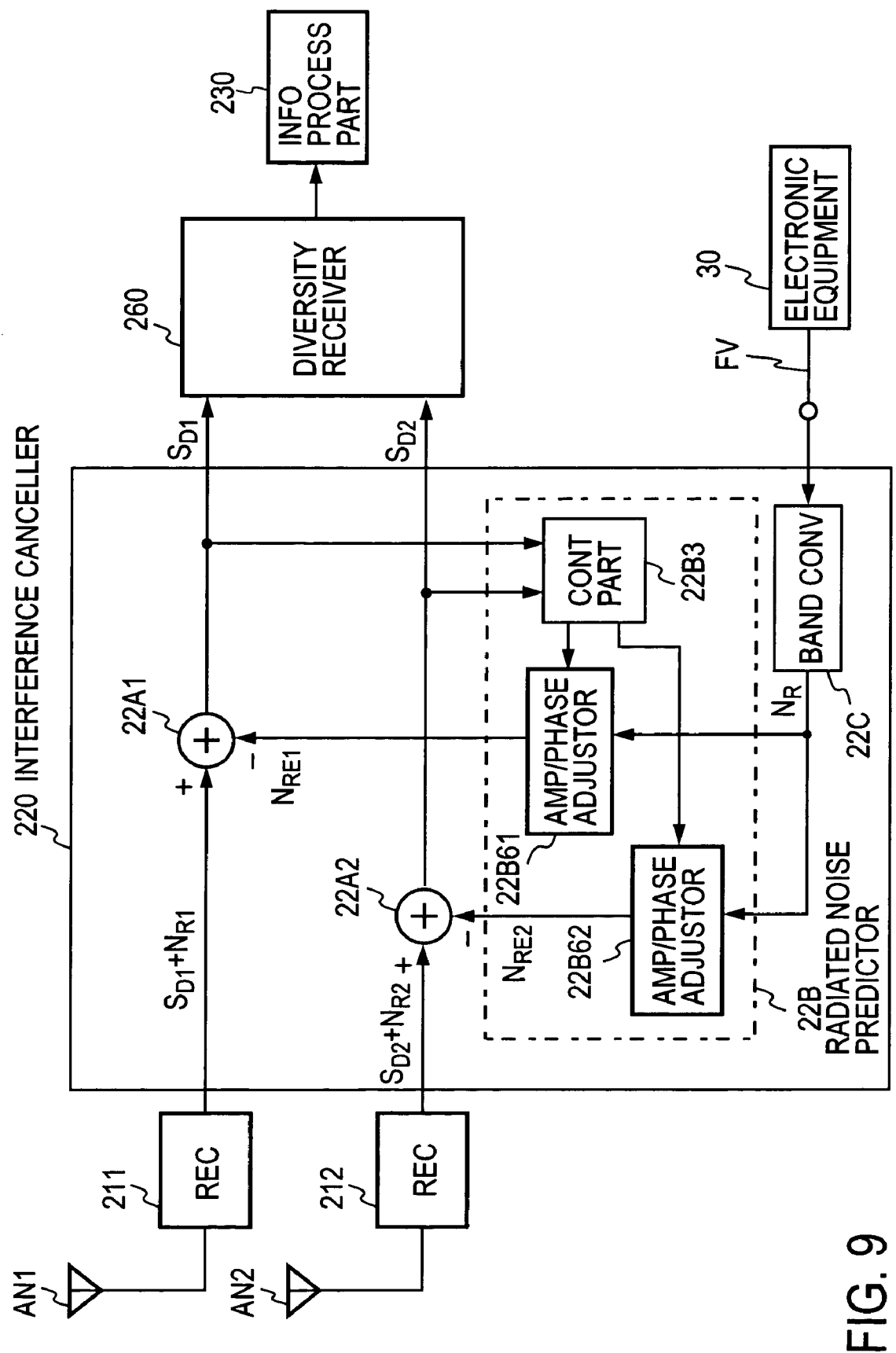
FIG. 9 is a block diagram for explaining a sixth embodiment of the radio communication terminal according to the present invention.

FIG. 9 illustrates in block from another embodiment of the radio communication terminal 200 provided with two antennas. In this embodiment the interference canceller 220 has adders 22A1 and 22A2 corresponding to the receivers 211 and 212, respectively, and the radiated noise predictor 22B has amplitude/phase adjustors 22B61 and 22B62. As in the case of the embodiments of FIGS. 2 and 3, the interference canceller 220 obtains the radiated noise component $N_R$ directly from the electronic equipment 30 via the cable FV and the band converting part 22C. The amplitude and phase of the radiated noise component $N_R$ are adjusted by the amplitude/phase adjustors 22B61 and 22B62 to generate pseudo interference signals $N_{RE1}$ and $N_{RE2}$ of the respective receiving routes, which are input to the first and second adders 22A1 and 22A2, by which the pseudo interference signals $N_{RE1}$ and $N_{RE2}$ are subtracted from the output signals from the receivers 211 and 212, respectively. As a result, the first and second adders 22A1 and 22A2 provide information signals $S_{D1}$ and $S_{D2}$ having removed therefrom the radiated noise, which are diversity received by a diversity receiver 260. While the FIG. 9 embodiment employs the diversity reception by two receiving routes, more receiving routes can be adopted.

Figure 10:
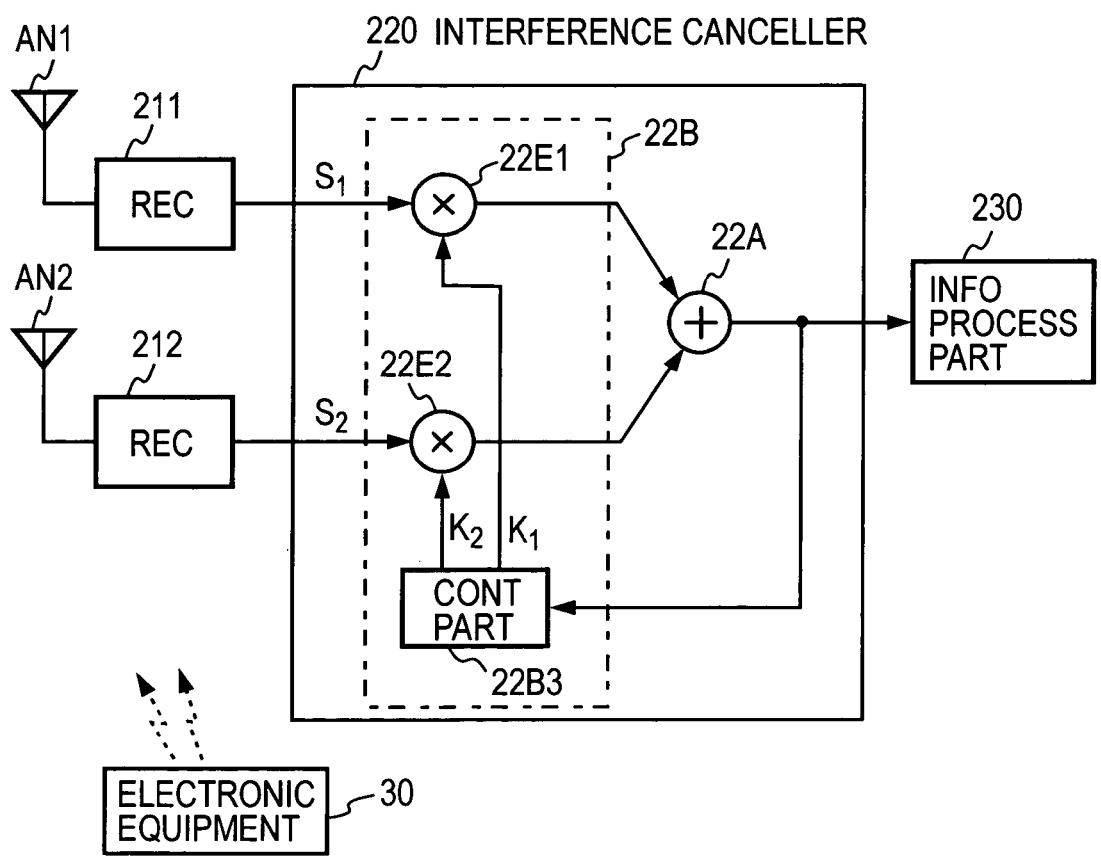
FIG. 10 is a block diagram for explaining a seventh embodiment of the radio communication terminal according to the present invention.

FIG. 10 illustrates in block form still another embodiment of the radio communication terminal 200 provided with two antennas. In this embodiment the interference canceller 220 comprises: multipliers 22E1 and 22E2 for complex multiplication of the output signals (complex signals) from the receivers 211 and 212 by tap coefficients $K_1$ and $K_2$, respectively to adjust their amplitudes and phases; an adder 22A which combines the multiplied outputs from the multipliers 22E1 and 22E2 and provides the combined output as the information signal SD to the information processing part 230; and a control part 22B3 for controlling the tap coefficients $K_1$ and $K_2$. The multipliers 22E1 and 22E2 and the control part 22B3 constitute the radiated noise predictor 22B.

Figure 11:
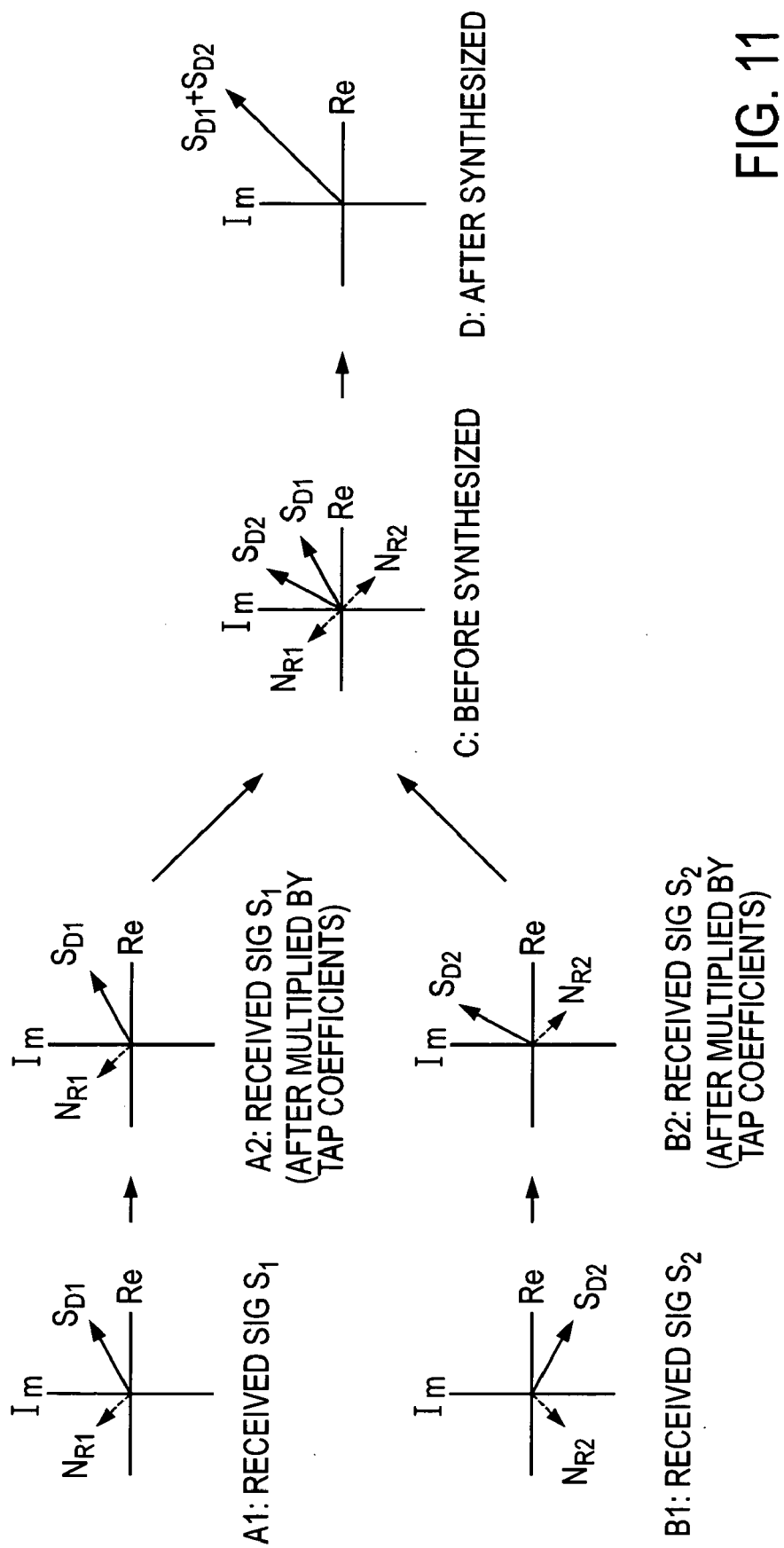
FIG. 11 is a diagram for explaining the operation of the FIG. 10 embodiment.

Referring now to FIG. 11, an example of a tap coefficient control method will be described. FIGS. 11-A1 and 11-B1 show vectors of the signals $S_1$ and $S_2$ received by the receiving antennas AN1 and AN2. The received signal $S_1$ includes an information signal vector $S_{D1}$ and a radiated noise vector $N_{R1}$, and the received signal $S_2$ includes an information signal vector $S_{D2}$ and a radiated noise vector $N_{R2}$. The tap coefficients $K_1$ and $K_2$ are so set as to shift the phase of the vector of one of the received signals to make the synthesized value of the radiated noise vectors $N_{R1}$ and $N_{R2}$ zero. FIG. 11 shows an example in which the received signal S2 is phase-rotated. By this phase rotation, the tap coefficients can be set so that the radiated noise vectors $N_{R1}$ and $N_{R2}$ are spaced 180° apart in phase as shown in FIG. 11C. The vector synthesis eliminates the radiated noise vectors and provides a synthetic vector of the received information signals $S_{D1}$ and $S_{D2}$ as shown in FIG. 11C. That is, it can be considered that in the FIG. 10 embodiment the radiated noise component $N_{RE1}$ in the output from the multiplier 22E1 and the radiated noise component $N_{RE2}$ in the output from the multiplier 22E2 each act as a pseudo interference signal with respect to the other.

While in the above the radio communication terminal according to the present invention has been described to receive transmission signals from a base station, the transmitting side is not limited specifically to the base station.

Effect of the Invention

As described above, according to the present invention, it is possible to cancel the radiated noise from electronic equipment and hence obtain a received signal with an excellent SN ratio. This permits reduction of the error occurrence rate, ensuring implementation of data communications of high transmission performance.

What is claimed is:

1. A radio communication terminal comprising:
a receiver connected to a receiving antenna; and
an interference canceller for canceling a radiated noise component of electronic equipment from a received signal output from said receiver;
wherein said interference canceller includes:
a band converting part connected to electronic equipment, for converting said radiated noise from said electronic equipment to the same band as that of the output received signal of said receiver;
a radiated noise predictor for generating a pseudo interference signal based on the converted output of said band converting part; and
an adder for adding together said received signal and said pseudo interference signal to cancel said radiated noise component in said received signal; and
wherein said radiated noise predictor includes:
an amplifier connected to the output of said band converting part, for controlling the level of the radiated noise obtained therefrom;
a phase shifter connected in series to said amplifier, for controlling the phase of said radiated noise; and
a control part for controlling the gain of said amplifier and the phase-shift amount of said phase shifter based on the output from said adder.

2. A radio communication terminal comprising:
a receiver connected to a receiving antenna;
an interference canceller for canceling a radiated noise component of electronic equipment from a received signal output from said receiver; and
a memory for storing a radiated noise component received by said receiver during a transmission interruption period of a transmitting side;
wherein said interference canceller includes:
a radiated noise predictor for generating a pseudo interference signal based on the radiated noise produced by said electronic equipment; and
an adder for adding together said received signal and said pseudo interference signal to cancel said radiated noise component in said received signal; and
wherein said radiated noise predictor includes
an adaptive filter for generating said pseudo interference signal by adaptively filtering the radiated noise component read out from said memory during the transmission interruption period or transmission period of the transmitting side; and
a control part for controlling coefficients of said adaptive filter based on the output from said adder.

3. A radio communication terminal comprising:
a receiver connected to a receiving antenna;
an interference canceller for canceling a radiated noise component of electronic equipment from a received signal output from said receiver; and
a training signal generating part for generating a training signal;
wherein said interference canceller includes:
a radiated noise predictor for generating a pseudo interference signal based on the radiated noise produced by said electronic equipment;
an adder for adding together said received signal and said pseudo interference signal to cancel said radiated noise component in said received signal; and
wherein said radiated noise predictor includes:
a selector for selecting the training signal from said training signal generating part during a period of transmission of a training signal from the transmitting side and for selecting the output from said adder during a period of receiving an information signal from the transmitting side;
a subtractor for subtracting the selected output of said selector from the output of said receiver;
an adaptive filter for generating said pseudo interference signal by adaptively filtering the output from said subtractor by filter coefficients; and
a control part for controlling the coefficients of said adaptive filter based on the output from said adder.

4. A radio communication terminal comprising:
a receiver connected to a receiving antenna;
an interference canceller for canceling a radiated noise component of electronic equipment from a received signal output from said receiver;
a second receiver connected to a second antenna;
wherein said interference canceller includes:
a radiated noise predictor for generating a pseudo interference signal based on the radiated noise produced by said electronic equipment;
an adder for adding together said received signal and said pseudo interference signal to cancel said radiated noise component in said received signal; and wherein said radiated noise predictor includes:
an amplitude/phase adjustor for adjusting the amplitude and phase of a received signal from said second receiver to generate said pseudo interference signal; and
a control part for controlling the amplitude and phase adjustments by said amplitude/phase adjustor based on the output from said adder during the transmission interruption period of the transmitting side so that said pseudo interference signal and the output from said first receiver cancel each other.

5. A radio communication terminal comprising:
a plurality of receivers each connected to one of a plurality of antennas;
an interference canceller for canceling radiated noise components of electronic equipment from received signals output from said plurality of receivers; and
a diversity receiver;
wherein: said interference canceller includes:
a radiated noise predictor for generating a plurality of pseudo interference signals based on the radiated noise produced by said electronic equipment;
a plurality of adders each for adding corresponding one of said plurality of pseudo interference signals to an output of corresponding one of said plurality of receivers to cancel said radiated noise component in each received signal and to extract an information signal from each received signal; and
wherein said radiated noise predictor includes a plurality of amplitude/phase adjustors for adjusting amplitude and phases of radiated noises from electronic equipment to generate pseudo interference signals in correspondence with said plurality of receivers, and a control part for controlling the amplitude and phase adjustments by said plurality of amplitude/phase adjustors based on the outputs from said plurality of adders during the transmission interruption period of the transmitting side, the outputs from said plurality of adders being diversity-received by said diversity receiver, and
wherein said interference canceller includes a band converting part which converts said radiated noise directly supplied via a cable from said electronic equipment to a same band as a band of the output received signal of said receiver and provides the converted output to said radiated noise predictor.

6. A radio communication terminal comprising:
a receiver connected to a receiving antenna;
an interference canceller for canceling a radiated noise component of electronic equipment from a received signal output from said receiver; and
a second receiver connected to a second receiving antenna;
wherein said interference canceller includes:
a radiated noise predictor for generating a pseudo interference signal based on the radiated noise produced by said electronic equipment; and
an adder for adding together said received signal and said pseudo interference signal to cancel said radiated noise component in said received signal; and
wherein said radiated noise predictor includes:
first and second multipliers for multiplying received signals from said first and second receivers by first and second tap coefficients, respectively, and for providing the multiplied outputs to said adder; and
a control part for controlling said first and second tap coefficients based on the output from said adder so that radio noise components in the outputs from said first and second multipliers cancel each other.

* * * * *